July 25, 1933.  J. C. McCUNE  1,919,443
DOOR CONTROL EQUIPMENT
Filed April 21, 1930
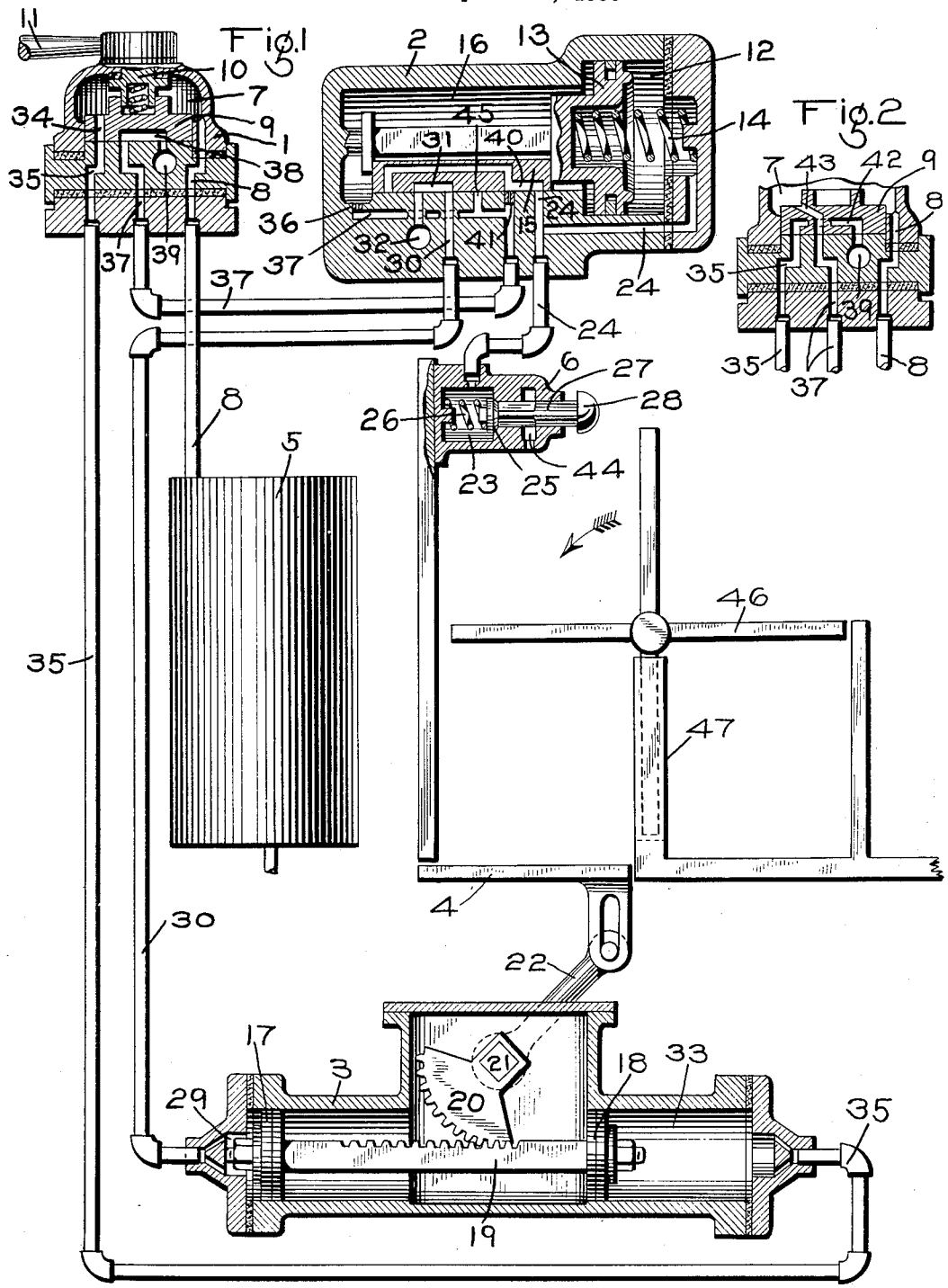
INVENTOR
JOSEPH C. McCUNE
BY Wm. M. Cady
ATTORNEY Patented July 25, 1933

1,919,443

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

DOOR CONTROL EQUIPMENT

Application filed April 21, 1930. Serial No. 445,858.

This invention relates to door controlling equipment for vehicles.

The principal object of my invention is to provide a vehicle door controlling equipment which is controlled by the operator and a passenger within the vehicle for opening an exit door and which is controlled by the operator for closing the door.

Other objects and advantages will appear in the following more detailed description of the invention.

In the accompanying drawing; Figure 1 is a diagrammatic view mainly in section, of a door control equipment embodying my invention, the door valve device being shown in door closed position; and Fig. 2 is a fragmentary sectional view showing the door valve in door open position.

As shown in the drawing, the door controlling equipment may comprise an operator's door valve device 1, a relay valve device 2, a door engine 3, a sliding door 4, a main reservoir 5, and a passenger's door opening valve device 6.

The valve device 1 may comprise a casing having a chamber 7, which is constantly connected to the main reservoir 5 through a pipe and passage 8 and contains a rotary valve 9, having a stem 10 on which an operating handle 11 is mounted.

The relay valve device 2 may comprise a casing having a chamber 12 containing a piston 13 which is subject to the pressure of a spring 14 also contained in the chamber 12, which piston is adapted to operate a slide valve 15 contained in a chamber 16.

The door engine 3 may comprise a casing having door opening and door closing pistons 17 and 18 respectively which are spaced apart and connected through the medium of a toothed bar 19. The teeth of this bar are adapted to mesh with the teeth of a quadrant 20 operatively connected to a rotatable shaft 21 suitably journalled in the casing. Operatively mounted on the outer end of this shaft is an operating arm 22, the free end of which is operatively connected to the exit door 4.

The valve device 6 may comprise a casing having a chamber 23, which is constantly connected to the piston chamber 12 in the relay valve device 2 through a pipe and passage 24, and contains a vent valve 25, which is subject to the pressure of a spring 26 also contained in the chamber 23. The valve 25 has a stem 27 which extends through an opening in the casing and its outer end is provided with a push button 28.

This valve device 6 is secured to the body of the vehicle in such a position that it is easily accessible to a passenger desiring to leave the vehicle.

With the equipment in door closed position as shown in Fig. 1 of the drawing, the door opening piston chamber 29 in the door engine is vented to the atmosphere by way of the door opening pipe and passage 30, a cavity 31 in the slide valve 15 of the relay valve device 2 and passage 32, and the door closing piston chamber 33 in the door engine is supplied with fluid under pressure from the valve chamber 7 in the valve device 1 through a port 34 in the rotary valve 9 and door closing passage and pipe 35.

The valve chamber 16 in the relay valve device is vented to the atmosphere through a choke plug 36, a passage and pipe 37, a cavity 38 in the rotary valve 9 of the valve device 1, and a passage 39. The piston chamber 12 in the relay valve device and the valve chamber 23 in the valve device 6 are both vented to the atmosphere through passage 24, a cavity 40 in the relay slide valve 15, a choke plug 41 and then through passage and pipe 37 and the valve device 1.

With the relay piston and valve chambers 12 and 16 respectively connected to the atmosphere, the pressure of the spring 14 maintains the piston 13 and slide valve 15 in their normal door closed positions as shown in Fig. 1.

When the vehicle is brought to a stop, the operator, by the use of the operating handle 11, rotates the rotary valve 9 to door open position in which fluid under pressure in the door closing piston chamber 33 in the door engine is vented to the atmosphere through the door closing pipe and passage 35, a cavity 42 in the rotary valve 9 of the valve device 1 and passage 39.

Further, with the valve device 1 in door open position, fluid under pressure is supplied from the rotary valve chamber 7 in the valve device 1 to the relay piston chamber 12 and the valve chamber 23 in the valve device 6 by way of a port 43 in the rotary valve 9, passage and pipe 37, choke plug 41 of the relay valve device, cavity 40 in the relay slide valve 15 and passage 24. Fluid under pressure also flows from the passage 37 in the relay valve device to the slide valve chamber 16 through choke plug 36.

It will here be noted that since fluid under pressure is thus simultaneously supplied to the piston chamber 12 and the slide valve chamber 16 in the relay valve device, the pressure of the spring 14 maintains the piston 13 and slide valve in their door closed position so that the operator cannot cause the door to be opened.

A passenger desiring to leave the vehicle, pushes the push button 28 on the valve device 6 inwardly and thus unseats the vent valve 25 against the pressure of the spring 26. With the vent valve thus unseated, fluid under pressure in the relay piston chamber 12 is vented to the atmosphere through passage and pipe 24, valve chamber 23 in the valve device 6, past the unseated vent valve and the fluted portion of its stem 27 and through a passage 44.

With the piston chamber 12 thus vented, fluid under pressure in the valve chamber 16 causes the piston 13 to move to its extreme right hand or door open position against the pressure of the spring 14, carrying with it the slide valve 15 to its door opening position. It will here be noted that as the piston chamber is vented and before the slide valve 15 is shifted to its door opening position there will be a flow of fluid under pressure from the passage 37 to the passage 24 through the choke plug 41, and since the flow of fluid through this choke plug is considerably less than the flow of fluid to the atmosphere, the fluid under pressure supplied through the choke plug will have no appreciable effect upon the movement of the relay piston 13 to door opening position.

When the slide valve 15 is in door opening position, fluid under pressure is supplied from the passage 37 in the relay valve device 2 to the door opening piston chamber in the door engine 3 through a port 45, cavity 31 in the relay slide valve 15 and door opening passage and pipe 30. Since the door closing piston chamber 33 is connected to the atmosphere by way of the door closing pipe and valve device 1 as before described, fluid under pressure supplied to the door opening piston chamber 29 acts on one side of the door opening piston 17 and causes both the door opening and door closing pistons and the bar 19 to shift toward the righ hand, rotating the quadrant 20, shaft 21 and arm 22 in an anti-clockwise direction, the arm 22 moving the door 4 from its closed position as shown in Fig. 1 to its open position.

The cavity 40 in the relay slide valve 15 is elongated, so that when the slide valve is in door opening position it establishes communication from the passage 24 to the atmospheric passage 32. With this communication established, any fluid under pressure which might leak past the piston 13 into the chamber 12 will flow to the atmosphere, thus guarding against the unintentional movement of the piston 13 to door closing position.

When the door begins to open or is open, the passenger may relieve the pressure on the push button 28 and when this is done, the pressure of the spring 26 causes the vent valve 25 to seat, closing communication from the valve chamber 23 to the atmosphere by way of passage 44.

Within the vehicle and adjacent the door is a turnstile 46 which is adapted to be turned only in the direction indicated by the arrow in Fig. 1 by the passenger leaving the vehicle. This turnstile, together with a fixed barrier 47 prevents passengers from entering the vehicle by way of the open exit.

To close the door 4, the operator returns the valve device 1 to door closed position in which fluid under pressure in the valve chamber 16 in the relay valve device is discharged to the atmosphere through the choke plug 36, passage and pipe 37, cavity 38 in the rotary valve 9 of the valve device 1 and passage 39, and further in which fluid under pressure is supplied to the door closing piston chamber 33 through the port 34 in the rotary valve 9 and door closing passage and pipe 35.

With the valve chamber 16 in the relay valve thus vented to the atmosphere, the pressure of the spring 14 causes the piston 13 to shift to its extreme left hand or door opening position as shown in Fig. 1, carrying with it the slide valve 15. With the slide valve thus returned to door closing position, fluid under pressure in door opening piston chamber 29 in the door engine is vented to the atmosphere through the door opening pipe and passage 30, cavity 31 in the slide valve 15 of the relay valve device and passage 32. With the door opening piston chamber 29 thus vented, fluid under pressure supplied to the door closing piston chamber 33 acts on one side of the door closing piston 18 and causes said piston, the door opening piston 17 and bar 19 to be shifted to their extreme left hand positions. As the bar 19 is thus shifted, the quadrant 20, shaft 21 and arm 22 are rotated in a clockwise direction, closing the door 4.

It will be noted from the foregoing description that if the vent valve 25 of the valve device 6 is unseated when the valve device 1 is in door closed position, the equipment will not operate to open the door and that when the valve device 1 is moved to door open position, the equipment will not operate to open the door, so that the opening of the door is controlled by the operator and the passenger.

It will be further noted that the closing of the door is under the control of the operator only.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a door controlling equipment for a vehicle, the combination with a door for the vehicle, of a fluid pressure controlled door engine for controlling the operation of said door, a door opening pipe connected to said door engine, a door closing pipe connected to said door engine, a manually operative valve device having a door closing position in which fluid under pressure is admitted to the door closing pipe and having a door opening position in which the door closing pipe is vented, a fluid pressure controlled valve device comprising a valve having a door closing position in which the door opening pipe is vented, said manually operative valve device and valve in door opening positions establishing communication through which fluid under pressure is admitted to the door opening pipe, a piston for operating said valve subject on both sides to fluid under pressure supplied through said manually controlled valve device when said valve device is operated to door opening position and a passenger's valve device operative to vent fluid under pressure from one side of said piston to effect the movement of said valve to door opening position.

2. In a door controlling equipment for a vehicle, the combination with a door for the vehicle, of a fluid pressure controlled door engine for controlling the operation of said door, a door opening pipe connected to said door engine, a door closing pipe connected to said door engine, a fluid pressure controlled valve device comprising a valve having a door closing position in which the door opening pipe is vented, a piston for actuating said valve, a manually controlled valve device having a door closing position in which fluid under pressure is admitted to the door closing pipe, said manually controlled valve device having a door opening position in which the door closing pipe is vented and in which fluid under pressure is supplied to both sides of said piston, and said valve having a door opening position in which fluid under pressure supplied through said manually controlled valve device is admitted to the door opening pipe, and means operative manually for venting fluid under pressure from one side of said piston for effecting the movement of said valve to door opening position.

3. In a door controlling equipment for a vehicle, the combination with a door for the vehicle, of a fluid pressure controlled door engine for controlling the operation of said door, a door opening pipe connected to said door engine, a door closing pipe connected to said door engine, a fluid pressure controlled valve device comprising a valve having a door closing position in which the door opening pipe is vented, a piston for operating said valve, a manually controlled valve device having a door closing position in which fluid under pressure is admitted to the door closing pipe, said manually controlled valve device having a door opening position in which the door closing pipe is vented and in which fluid under pressure is supplied to both sides of said piston, and said fluid pressure controlled valve device having a door opening position in which fluid under pressure supplied through said manually controlled valve device is admitted to the door opening pipe, and a passenger's valve device operative to vent fluid under pressure from one side of said piston to effect the movement of said valve to door opening position.

4. In a door controlling equipment for a vehicle, the combination with a door for the vehicle, of a fluid pressure controlled door engine for controlling the operation of said door, a relay valve device for controlling the operation of said door, said relay valve device comprising a valve having a door closing position for establishing communication through which the door opening side of the door engine is connected to the atmosphere and having a door opening position for establishing communication through which fluid under pressure is adapted to be supplied to the door opening pipe, and a piston for operating said valve, a manually controlled valve device having a door closing position and a door opening position, said manually controlled valve device when in door opening position establishing communication through which fluid under pressure is supplied to both sides of said piston and establishing communication through which fluid under pressure is vented from the door closing side of the door engine, a spring for maintaining said valve in door closing position when fluid is supplied to both sides of said piston, and a passenger's valve device operative to vent fluid under pressure from one side of said piston to effect the operation of said valve to door opening position.

5. In a door controlling equipment for a vehicle, the combination with a door for the vehicle, of a fluid pressure controlled door engine for controlling the operation of said door, a door opening pipe connected to said door engine, a door closing pipe connected to said door engine, a relay valve device operative to control the operation of said door, said relay valve device comprising a casing, a movable abutment mounted in said casing and a valve operatively carried by said abutment, a manually controlled valve device having a door closing position connecting both sides of said abutment to the atmosphere and for supplying fluid under pressure to the door closing pipe, and having a door opening position for supplying fluid under pressure to both sides of said abutment and for venting fluid under pressure from the door closing pipe, means for maintaining said abutment in door closing position with the manually controlled valve device in either of said positions, said valve in door closing position establishing communication from the door opening pipe to the atmosphere, and a passenger's valve device operative to vent fluid under pressure from one side of said abutment when the first mentioned manually controlled valve device is in door opening position to effect the operation of said abutment to shift said valve to door opening position for establishing communication through which fluid under pressure is supplied to the door opening pipe.

JOSEPH C. McCUNE.